(12) United States Patent
Tutubalina et al.

(10) Patent No.: US 11,379,668 B2
(45) Date of Patent: Jul. 5, 2022

(54) TOPIC MODELS WITH SENTIMENT PRIORS BASED ON DISTRIBUTED REPRESENTATIONS

(71) Applicant: SAMSUNG ELECTRONICS CO., LTD., Suwon-si (KR)

(72) Inventors: Elena Viktorovna Tutubalina, Kazan (RU); Sergey Igorevich Nikolenko, Saint Petersburg (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 16/510,111

(22) Filed: Jul. 12, 2019

(65) Prior Publication Data
US 2020/0019611 A1 Jan. 16, 2020

(30) Foreign Application Priority Data

Jul. 12, 2018 (RU) .......................... RU2018125550
Dec. 7, 2018 (RU) .......................... RU2018143490
Jul. 11, 2019 (KR) ........................ 10-2019-0083893

(51) Int. Cl.
*G06F 16/35* (2019.01)
*G06F 40/289* (2020.01)
(Continued)

(52) U.S. Cl.
CPC .............. *G06F 40/30* (2020.01); *G06F 17/16* (2013.01); *G06F 17/18* (2013.01)

(58) Field of Classification Search
CPC ........ G06F 40/30; G06F 40/216; G06F 16/35; G06F 40/279; G06F 17/16; G06F 17/18; G06F 16/345; G06F 16/353
See application file for complete search history.

(56) References Cited

U.S. PATENT DOCUMENTS 7,788,087 B2 8/2010 Corston-Oliver et al.
8,458,115 B2 * 6/2013 Cai ....................... G06F 16/353
706/52
(Continued)

FOREIGN PATENT DOCUMENTS

RU 2571373 C2 10/2015
RU 2628436 C1 8/2017
WO WO-2013185856 A1 * 12/2013 ....... G06F 17/30705

OTHER PUBLICATIONS

Vorontsov, "Additive regularization for topic models of text collections" 2014, InDoklady Mathematics May 2014 (vol. 89, No. 3, pp. 301-304). Pleiades Publishing.*

(Continued)

*Primary Examiner* — Olujimi A Adesanya
(74) *Attorney, Agent, or Firm* — Sughrue Mion, PLLC (57) ABSTRACT

There are provided a device and method for topic modeling with sentiment priors based on distributed representations. A method for topic modeling with sentiment priors based on distributed representations includes: inputting a review into a topic model; and by the topic model, determining a representation for each word in the review, wherein the representations are word vectors in a semantic space; and estimating the representations using the sentiment priors to determine a topic corresponding to the review, wherein the topic model includes the sentiment priors trained on the basis of the representations distributed by using a regularizer, the regularizer defining the same sentiment to words having similar word vectors, and wherein each sentiment prior is the same for words having similar word vectors.

5 Claims, 6 Drawing Sheets

(51) Int. Cl.
  G06F 40/30    (2020.01)
  G06F 17/16    (2006.01)
  G06F 17/18    (2006.01)

(56) References Cited

U.S. PATENT DOCUMENTS

| | | | |
|---|---|---|---|
| 2013/0018651 A1* | 1/2013 | Djordjevic | G06Q 10/00 |
| | | | 704/9 |
| 2016/0048768 A1* | 2/2016 | Liu | G06Q 30/0631 |
| | | | 706/11 |
| 2016/0179966 A1* | 6/2016 | Park | G06F 16/9535 |
| | | | 707/728 |
| 2017/0293687 A1 | 10/2017 | Kolotienko et al. | |
| 2020/0293902 A1* | 9/2020 | Li | G06N 7/005 |

OTHER PUBLICATIONS

Apishev et al, "Additive regularization for topic modeling in sociological studies of user-generated texts", 2016, InMexican International Conference on Artificial Intelligence Oct. 23, 2016 (pp. 169-184). Springer, Cham.*

Fu et al, "Weakly supervised topic sentiment joint model with word embeddings", May 2018, Knowledge-Based Systems. May 1, 2018;147:43-54.*

Lin et al, "Weakly supervised joint sentiment-topic detection from text", 2011, IEEE Transactions on Knowledge and Data engineering. Feb. 10, 2011;24(6):1134-45.*

Tutubalina et al, "Automated prediction of demographic information from medical user reviews" Nov. 2016, InInternational Conference on Mining Intelligence and Knowledge Exploration,Nov. 13, 2016 (pp. 174-184). Springer, Cham.*

Communication dated Nov. 29, 2019, issued by the Russian Patent Office in counterpart Russia Application No. 2018143490/08.

Al-Rfou, Rami et al., "Polyglot: Distributed Word Representations for Multilingual NLP", Proceedings of the Seventeenth Conference on Computational Natural Language Learning, 2013, pp. 183-192, Sofia, Bulgaria. Association for Computational Linguistics. (10 pages total).

Arefyev, N. V. et al., "Evaluating Three Corpus-Based Semantic Similarity Systems for Russian", Proceedings of International Conference on Computational Linguistics Dialogue, 2015. (13 pages total).

James Bergstra et al., "Theano: A CPU and GPU Math Compiler in Python", Proceedings of the 9th Python in Science Conference (SCIPY), 2010, vol. 4, pp. 1-7. (7 pages total).

Blei, David M. et al., "Dynamic Topic Models", Proceedings of the 23rd International Conference on Machine Learning, 2006, pp. 113-120, New York, NY, USA. (8 pages total).

Blei, David M. et al., "Supervised topic models", Advances in Neural Information Processing System, 2007, vol. 22. (8 pages total).

Blei, David M. et al., "Latent Dirichlet Allocation", Journal of Machine Learning Research, 2003, vol. 3, pp. 993-1022. (30 pages total).

Cao, Ziqiang et al., "A Novel Neural Topic Model and Its Supervised Extension", Proceedings of the Twenty-Ninth AAAI Confernece on Artificial Intelligence, Jan. 25, 2015-Jan. 30, 2015, pp. 2210-2216, Austin, Texas, USA. (7 pages total).

J. Chang et al., "Hierarchical Relational Models for Document Networks", The Annals of Applied Statistics, 2010, vol. 4, No. 1, pp. 124-150. (27 total pages).

Q. Diao et al., "Jointly Modeling Aspects, Ratings and Sentiments for Movie Recommendations (JMARS)", Proceedings of the 20th ACM SIGKDD International Conference on Knowledge Discovery and Data Mining, 2014, pp. 193-202. (10 pages total).

Yoav Goldberg, "A Primer on Neural Network Models for Natural Language Processing", Oct. 5, 2015, CoRR, abs/1510.00726. (76 pages total).

T. Griffiths et al., "Finding scientific topics", Proceedings of the National Academy of Sciences, Apr. 6, 2004, vol. 101, Suppl. 1, pp. 5228-5235. (8 total pages).

L. Hong et al., "Discovering Geographical Topics In The Twitter Stream", Proceedings of the 21st International Conference on World Wide Web, 2012, pp. 769-778. (10 pages total).

N. Kalchbrenner et al., "A Convolutional Neural Network for Modelling Sentences", Proceedings of the 52nd Annual Meeting of the Association for Computational Linguistics, vol. 1: Long Papers, Jun. 23, 2014-Jun. 25, 2014, pp. 655-665, Baltimore, Maryland, Association for Computational Linguistics. (11 pages total).

S. Kim et al., "A Hierarchical Aspect-Sentiment Model for Online Reviews", Proceedings of the Twenty-Seventh AAAI Conference on Artificial Intelligence, Jul. 14, 2013-Jul. 18, 2013, Bellevue, Washington, USA. (8 pages total).

F. Li et al., "SUIT: A Supervised User-Item Based Topic Model for Sentiment Analysis", Proceedings of the Twenty-Eighth AAAI Conference on Artificial Intelligence, 2014, pp. 1636-1642. (7 pages total).

S. Z. Li "Markov Random Field Modeling in Image Analysis", 2009, Advances in Pattern Recognition, Springer, Berlin Heidelberg. (337 pages total).

C. Lin et al., "Weakly Supervised Joint Sentiment-Topic Detection from Text", IEEE Transactions on Knowledge and Data Engineering, vol. 24, No. X, 2012, pp. 1134-1145. (12 pages total).

B. Liu, "Sentiment Analysis: Mining Opinions, Sentiments, and Emotions", 2015, Cambridge University Press, https://www.cambridge.org/core/books/sentiment-analysis/3F0F24BE12E66764ACE8F179BCDA42E9 (URL to table of contents).

B. Lu et al., "Multi-aspect Sentiment Analysis with Topic Models", Data Mining Workshops (ICDMW), 2011, IEEE 11th International Conference, pp. 81-88. (8 pages total).

T. Mikolov et al., "Efficient Estimation of Word Representations in Vector Space", arXiv:1301.3781v3 [cs.CL], Sep. 7, 2013. (12 pages total).

T. Mikolov et al., "Distributed Representations of Words and Phrases and Their Compositionality", 2013, CoRR, abs/1310.4546. (9 pages total).

T. P. Minka, "Estimationg a Dirichlet distribution", 2000, CiteSeerx. (16 pages total).

A. Panchenko et al., "RUSSE: The First Workshop on Russian Semantic Similarity", Proceedings of the International Conference on Computational Linguistics and Intellectual Technologies (Dialogue), 2015, pp. 89-105. (16 pages total).

J. Pennington et al., "GloVe: Global Vectors for Word Representation", Proceedings of the 2014 Conference on Empirical Methods in Natural Language Processing (EMNLP), pp. 1532-1543, Doha, Qatar. Association for Computational Linguistics. (12 pages total).

D. Quercia et al., "TweetLDA: Supervised Topic Classification and Link Prediction in Twitter", In WebSci 2012, Jun. 22, 2012-Jun. 24, 2012, pp. 247-250. (4 pages total).

R. Rehurek et al., "Software Framework for Topic Modelling with Large Corpora", Proceedings of the LREC 2010 Workshop on New Challenges for NLP Frameworks, 2010, pp. 45-50, Valletta, Malta. ELRA. http://is.muni.cz/publication/884893/en. (5 pages total).

D. O. Seaghdha et al., "Unsupervised learning of rhetorical structure with untopic models", Proceedings of COLING 2014, the 25th International Conference on Computational Linguistics: Technical Papers, pp. 2-13, Dublin, ireland, Aug. 23, 2014-Aug. 29, 2014. (12 pages total).

Titov, Ivan et al., "Modeling Online Reviews with Multi-grain Topin Models", Proceedings of the 17th International Conference on World Wide Web, Apr. 21, 2008-Apr. 25, 2008, Beijing, China, pp. 111-120, ACM. (10 pages total).

Tutubalina, Elena et al., "Inferring Sentiment-Based Priors in Topic Models", Proceedings of the 14th Mexican International Conference on Artificial Intelligence, Lecture Notes in Computer Science, 2015, vol. 9414, pp. 92-104, Springer. (13 pages total).

Wang, Chong et al., "Continuous Time Dynamic Topic Models", Proceedings of the 24th Conference on Uncertainty in Artificial Intelligence, 2008. (8 pages total).

(56) References Cited

OTHER PUBLICATIONS

Wang, Hongning et al., "Latent Aspect Rating Analysis without Aspect Keyword Supervision", Proceedings of the 17th ACM SIGKDD International Conference on Knowledge Discovery and Data Mining, 2011, pp. 618-626, ACM. (9 pages total).

Wang, Xin et al., "Predicting Polarities of Tweets by Composing Word Embeddings with Long Short-Term Memory", Proceedings of the 53rd Annual Meeting of the Association for Computational Linguistics and the 7th International Joint Conference on Natural Language Processing, 2015, vol. 1: Long Papers, pp. 1343-1353, Beijing, China, Association for Computational Linguistics. (11 pages total).

Wang, Xuerui et al., "Topics over Time: A Non-Markov Continuous-Time Model of Topical Trends", Proceedings of the 12th ACM SIGKDD International Conference on Knowledge Discovery and Data Mining, 2005, pp. 424-433, New York, NY, USA, ACM. (10 pages total).

Wilson, Theresa et al., "Recognizing Contextual Polarity in Phrase-Level Sentiment Analysis", Proceedings of the Conference on Human Language Technology and Empirical Methods in Natural Language Processing, 2005, pp. 347-354, Association for Computational Linguistics. (8 pages total).

Wu, Yu et al., "Topic Augmented Neural Network for Short Text Conversation", arXiv:1605.00090v1, [cs.CL], Apr. 30, 2016. (10 pages total).

Yang, Min et al., "Ordering-Sensitive and Semantic-Aware Topic Modeling", Proceedings of the Twenty-Ninth AAAI Conference on Artificial Intelligence, 2015, pp. 2353-2359. (7 pages total).

Yang, Zaihan et al., "Parametric and Non-parametric User-aware Sentiment Topic Models", Proceedings of the 38th International ACM SIGIR Conference on Research and Development in Information Retrieval, 2015, pp. 413-422, ACM. (10 pages total).

Jo, Yohan et al., "Aspect and Sentiment Unification Model for Online Review Analysis", Proceedings of the Fourth ACM International Conference on Web Search and Data Mining, WSDM '11, Feb. 9, 2011-Feb. 12, 2011, Hong Kong, China, pp. 815-824. (10 pages total).

\* cited by examiner

TOPIC MODELS WITH SENTIMENT PRIORS BASED ON DISTRIBUTED REPRESENTATIONS

CROSS-REFERENCE TO RELATED APPLICATION(S)

This application is based on and claims priority under 35 U.S.C. § 119(a) to Russian Patent Application No. 2018125550, filed on Jul. 12, 2018, in the Russian Patent Office, Russian Patent Application No. 2018143490, filed on Dec. 7, 2018, in the Russian Patent Office, and Korean Patent Application No. 10-2019-0083893, filed on Jul. 11, 2019, in the Korean Intellectual Property Office, the disclosure of each of the above-named applications is incorporated by reference herein in its entirety.

BACKGROUND

Field

The disclosure relates to the topic modeling and, in particular, to a device and method for topic modeling with sentiment priors based on distributed representations.

Description of Related Art

Topic modeling has become the model of choice for a number of applications dealing with unsupervised analysis of large text collections. The basic Latent Dirichlet Allocation model has been subject to many extensions with different goals that include modeling interrelated topics, topic evolution in time, supervised approaches with a response variable, and so on.

One application of topic models has been in the field of sentiment analysis.

SUMMARY

The disclosure provides an approach where sentiment priors are trained in the space of word embedding; this allows to both discover more aspect-related sentiment words and further improve classification.

In accordance with an aspect of the disclosure, there is provided a method to combine the strengths of both topic models and distributed representations by training a sentiment topic model with priors based on word embeddings. Instead of training separate priors β independently for every word, a sentiment prior is trained on the basis of semantically coherent words in the semantic space that automatically extends to highly similar, interchangeable words. Such approach allows substantially extending the trained sentiment dictionaries and improve sentiment classification. Furthermore, instead of a single unified sentiment prediction provided by, e.g., an LSTM, this approach yields specific positive and negative words for individual aspects in a review, which provides a more detailed and easily interpretable perspective on sentiment evaluation.

In accordance with an aspect of the disclosure, there is provided a technique for automatically updating sentiment priors for interchangeable words based on distributed representations. The experimental evaluation has shown that this idea leads to improvements in sentiment classification and prediction of user attributes over topic models based on predefined priors and models that update sentiment priors for individual words. Qualitative analysis of the discovered topics also shows that suggested model with modified priors can find coherent topics in an accurate manner. Furthermore, it is possible to provide the interplay between sentiment priors in LDA extensions and distributed word representations; it will be possible to incorporate distributed word representations directly into other priors.

In accordance with an aspect of the disclosure, there is provided a method for topic modeling with sentiment priors based on distributed representations, the method including: inputting a review (text document) into a topic model; and by the topic model: determining a representation for each word in the review, wherein the representations are word vectors in a semantic space; and estimating the representations using the sentiment priors to determine a topic corresponding to the review, wherein the topic model includes the sentiment priors trained on the basis of the representations distributed by using a regularizer, the regularizer defining the same sentiment to words having similar word vectors, and wherein each sentiment prior is the same for words having similar word vectors.

In accordance with an aspect of the disclosure, there is provided the method, wherein training the sentiment priors includes: inputting a set of words into the topic model; and by the topic model: determining a set of nearest neighbors for each word, determining a representation for each word, wherein the representations are word vectors in the semantic space; calculating a regularization coefficient of the regularizer to define the regularizer by estimating, for each word, probabilities of occurring the word in sentiment with certain counters by using the representations and the set of nearest neighbors; defining the same sentiment to words having similar word vectors by using the regularizer; distributing the representations according to results of the defining; and calculating the sentiment priors using distributed representations.

In accordance with an aspect of the disclosure, there is provided the method, wherein training the sentiment priors further includes: predicting user attributes by the topic model using the sentiment priors trained on the basis of the representations distributed by using the regularizer, wherein the user attributes includes at least one of location, gender, and age of the user; and updating the sentiment priors based on predicted user attributes.

In accordance with an aspect of the disclosure, there is provided the method, wherein the estimating the representations using the sentiment priors includes a maximization of likelihood of the topic model, including: updating the regularization coefficient; and updating the sentiment priors using the regularizer having updated regularization coefficient.

In accordance with an aspect of the disclosure, there is provided a device for topic modeling with sentiment priors based on distributed representations, the device including: a processor; and a memory including a topic model and instructions causing the processor to: input a review into the topic model; determine, by the topic model, a representation for each word in the review, wherein the representations are word vectors in a semantic space; and estimate, by the topic model, the representations using the sentiment priors to determine a topic corresponding to the review, wherein the topic model includes the sentiment priors trained on the basis of the representations distributed by using a regularizer, the regularizer defining the same sentiment to words having similar word vectors, and wherein each sentiment prior is the same for words having similar word vectors.

In accordance with an aspect of the disclosure, there is provided the device, wherein, for training the sentiment priors, the memory further includes instructions causing the processor to: input a set of words into the topic model; and by the topic model: determine a set of nearest neighbors for each word, determine a representation for each word, wherein the representations are word vectors in the semantic space; calculate a regularization coefficient of the regularizer to define the regularizer by estimating, for each word, probabilities of occurring the word in sentiment with certain counters by using the representations and the set of nearest neighbors; define the same sentiment to words having similar word vectors by using the regularizer; distribute the representations according to results of the defining; and calculate the sentiment priors using distributed representations.

In accordance with an aspect of the disclosure, there is provided the device, wherein, for training the sentiment priors, the memory further includes instructions causing the processor to: predict user attributes by the topic model using the sentiment priors trained on the basis of the representations distributed by using the regularizer, wherein the user attributes includes at least one of location, gender, and age of the user; and update the sentiment priors based on predicted user attributes.

In accordance with an aspect of the disclosure, there is provided the device, wherein the memory further includes instructions causing the processor to: in the estimating the representations using the sentiment priors, perform a maximization of likelihood of the topic model, including: updating the regularization coefficient; and updating the sentiment priors using the regularizer having updated regularization coefficient.

BRIEF DESCRIPTION OF THE DRAWINGS

The above and other aspects, features, and advantages of the disclosure will be more apparent from the following detailed description taken in conjunction with the accompanying drawings, in which.

In the following description, unless otherwise described, the same reference numerals are used for the same elements when they are depicted in different drawings, and overlapping description thereof will be omitted.

DETAILED DESCRIPTION OF EMBODIMENTS

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only.

It is to be understood that the singular forms "a," "an," and "the" include plural referents unless the context clearly dictates otherwise. Thus, for example, reference to "an eye region" includes reference to one or more of such images.

It will be understood that, although the terms first, second, etc. may be used herein in reference to elements of the disclosure, such elements should not be construed as limited by these terms. The terms are used only to distinguish one element from other elements.

It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In various embodiments of the disclosure, "module" or "unit" may perform at least one function or operation, and may be implemented with hardware, software, or a combination thereof. "Plurality of modules" or "plurality of units" may be implemented with at least one processor (not shown) through integration thereof with at least one module other than "module" or "unit" which needs to be implemented with specific hardware.

The basic Latent Dirichlet Allocation model (Blei et al., 2003; Griffiths and Steyvers, 2004) has been subject to many extensions with different goals that include modeling interrelated topics (Li, 2009; Chang and Blei, 2010), topic evolution in time (Wang and McCallum, 2006; Blei and Lafferty, 2006; Wang et al., 2008), supervised approaches with a response variable (Blei and McAuliffe, 2007), and so on.

One application of topic models has been in the field of sentiment analysis. Recently, topic models have been successfully applied to aspect-based opinion mining: topic models are able to identify latent topical aspects with sentiments towards them in reviews (texts) and other sentiment-related datasets in an unsupervised way (Titov and McDonald, 2008; Moghaddam and Ester, 2012). Recent studies usually define an aspect as an attribute or feature of the product that has been commented upon in a review and can be clustered into coherent topics or aspects (Moghaddam and Ester, 2012; Lin et al., 2012; Yang et al., 2015b); e.g., "cupcake" and "steak" are part of the topic "food" for restaurants.

Topic models dealing with sentiment analysis usually incorporate sentiment labels for individual words. Such topic models as JST and Reverse-JST (Lin et al., 2012), ASUM (Yohan and H., 2011), and USTM (Yang et al., 2015b) use related art dictionaries of sentiment words to set sentiment priors β for individual words in certain topics. Tutubalina and Nikolenko (2015) proposed a new approach that consists in starting with a seed dictionary of sentiment words but then training new priors β with an expectation-maximization approach. Such approach enables to discover new sentiment words, especially aspect-related sentiment words that could not be listed in a dictionary, have different sentiment priors for the same words in different aspects, and it has been shown that a sentiment classification is generally improved.

On the other hand, recent advances in distributed word representations have made it into a method of choice for modern natural language processing (Goldberg, 2015). In this approach, words are embedded into Euclidean space for trying to capture semantic relations with the geometry of this semantic space. Starting from the works of Mikolov et al. (2013a; 2013b), distributed word representations have been applied for numerous natural language processing problems, including text classification, extraction of sentiment lexicons, part-of-speech tagging, syntactic parsing and so on. In particular, long short-term memory networks (LSTM) over word embedding have been successfully applied to sentiment analysis by Wang et al. (2015), while convolutional networks, which aim to discern local features (e.g., sentiment words in this case), have been used for sentiment analysis by Kalchbrenner et al. (2014). Several approaches that combine topic models and word vectors have already been proposed, e.g., the neural topic models of Cao et al. (2015) and Gaussian mixture topic models of Yang et al. (2015a), but have not yet been extended to sentiment-based topic models.

Traditional aspect-based approaches to sentiment analysis extract phrases that contain words from predefined and usually manually constructed lexicons or words that have been shown by trained classifiers to predict a sentiment polarity. These works usually distinguish affective words that express feelings ("happy", "disappointed") and evaluative words that express sentiment about a specific thing or aspect ("perfect", "awful"); these words come from a known dictionary, and the model is supposed to combine the sentiments of individual words into a total estimate of the entire text and individual evaluations of specific aspects. For a recent overview of opinion mining see (Liu, 2015); a sentiment lexicon plays a central role in most methods.

Recently, several topic models have been proposed and successfully used for sentiment analysis. Probabilistic topic models, usually based on Latent Dirichlet Allocation (LDA) and its extensions (Lin et al., 2012; Yohan and H., 2011; Yang et al., 2015b; Lu et al., 2011), assume that there is a document-specific distribution over sentiments since sentiment depends on a document, and the models' priors are based on the lexicon.

Figure 1A:
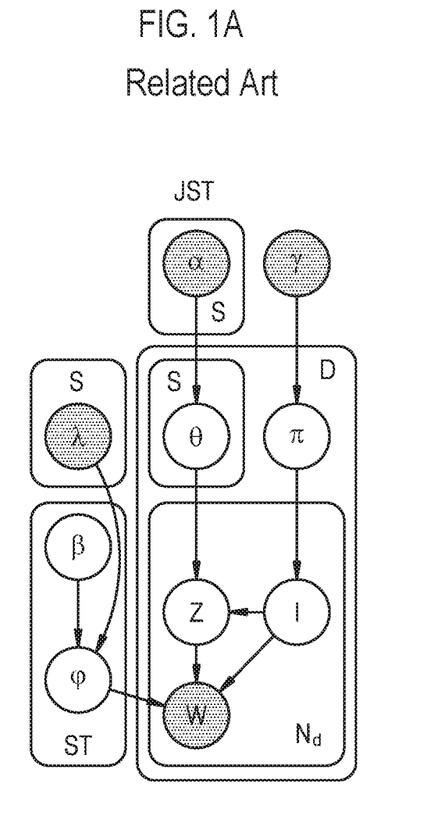
FIG. 1A shows sentiment LDA extensions for Joint Sentiment-Topic (JST) according to an embodiment.
Figure 1B:
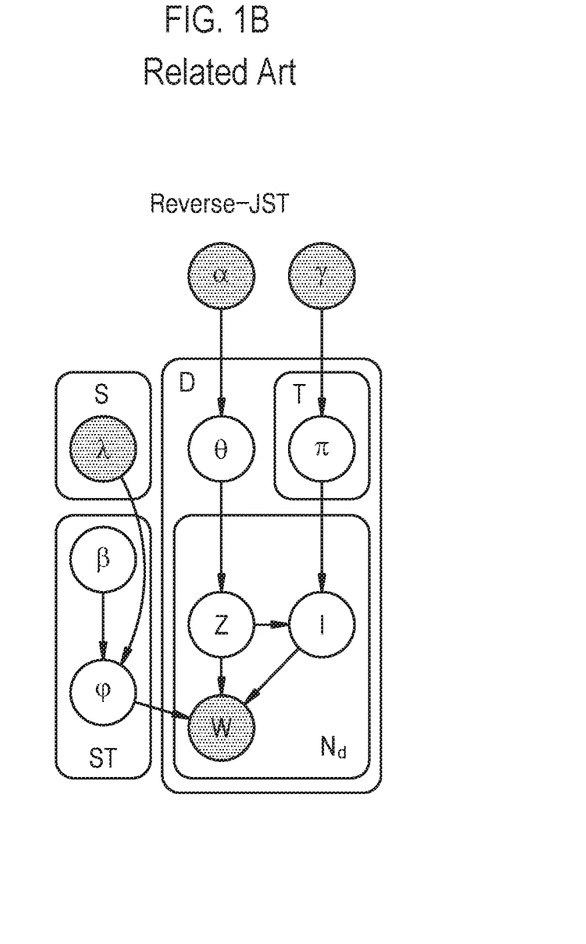
FIG. 1B shows sentiment LDA extensions for Reverse Joint Sentiment-Topic (Reverse-JST) according to an embodiment.

Referring to FIGS. 1A and 1B, Lin et al. (2012) has proposed sentiment modifications of LDA called Joint Sentiment-Topic (JST) and Reverse Joint Sentiment-Topic (Reverse-JST) models with the basic assumption that in the JST model, topics depend on sentiments from a document's sentiment distribution $\P_d$ and words are generated conditionally on sentiment-topic pairs, while in the Reverse-JST model sentiments are generated conditionally on the document's topic distribution $\Theta_d$. Lin et al. (2012) derive Gibbs sampling distributions for both models.

Similar to the JST, Jo and Oh (2011) has proposed the Aspect and Sentiment Unification Model (ASUM), where all words in a sentence are generated from one topic with the same sentiment. Topics (aspects from reviews) are generated from a sentence distribution over sentiments. ASUM achieves an improvement over supervised classifiers and other generative models, including JST.

Yang et al. (2015b) has proposed User-Aware Sentiment Topic Models (USTM), which incorporate user meta-data with topics and sentiments. In this model, topics depend on the document's tags, and words are conditioned on the latent topics, sentiments and tags. USTM provides a substantial improvement over JST and ASUM in the prediction of reviews' sentiment; however, the authors did not analyze the minimal number of tags needed for high-performance training without possible overfitting.

It should be noted a nonparametric hierarchical extension of ASUM called HASM (Kim et al., 2013) and nonparametric extensions of USTM models, USTM-DP(W) and USTM-DP(S) (Yang et al., 2015b).

Related art topic models for aspect-based sentiment analysis almost invariably assume a predefined dictionary of sentiment words, usually incorporating this information into the priors $\beta$ for the word-topic distributions in the LDA model. It has been found that an asymmetric Dirichlet prior over the per document topic-based sentiment proportions yields an improvement in classification over models with symmetric priors (Yang et al., 2015b). Tutubalina and Nikolenko (2015) propose a novel approach for automatic updates of sentiment labels for individual words in a semi-supervised fashion, starting from a small seed dictionary with optimization based on Expectation-Maximization. On each E-step, the sentiment priors $\beta_{kw}$ are updated proportionally to the number of words w generated with sentiment label k in the corpus, with a coefficient that decreases with the number of iterations to avoid overfitting. However, this approach treats every word as an independent dimension, and overall seems to suffer from too many independent variables.

Training sentiment priors $\beta$ can be regarded as part of an effort for optimizing priors in topic models. In related work, topic hyperparameters $\alpha$ have been optimized with fixed-point iteration to maximize the log-evidence (Minka, 2000). Seaghdha and Teufel (2014) use the hyperparameters of a Bayesian latent variable model to investigate rhetorical and topical language, sampling them with Hamiltonian Monte Carlo. Hong et al. (2012) utilize a mixture between EM and a Monte Carlo sampler to effectively learn all parameters in variational inference. Another group of optimization methods for sentiment model parameters minimizes the errors between observed and predicted ratings. Diao et al. (2014) use gradient descent to minimize an objective function that consists of prediction error on user ratings and probability of observing the text conditioned on priors. Li et al. (2014) construct a supervised user-item based topic model that optimizes priors and other parameters using textual topic distribution and employs user and item latent factors to predict ratings. Supervised topic models are not considered with observed labels here but are noted as a possible direction for future work.

Finally, distributed word representations, i.e., models that map each word occurring in the dictionary to a Euclidean space are used in the disclosure, attempting to capture semantic relationships between the words as geometric relationships in the Euclidean space. Usually, one first a vocabulary with one-hot representations of individual words is constructed, where each word corresponds to its own dimension, and then representations are trained for individual words starting from there, basically as a dimensionality reduction problem (Mikolov et al., 2013b). For this purpose, researchers have usually employed a model with one hidden layer that attempts to predict the next word based on a window of several preceding words. Then representations learned at the hidden layer are taken to be the word's features; other variations include GloVe (Global Vectors for Word Representation) (Pennington et al., 2014) and other methods (Al-Rfou et al., 2013).

There have been several attempts to use distributed word representations to construct topic models. The Neural Topic Model developed by Cao et al. (2015) models both topic-word and document-topic distributions with neural networks by training n-gram embeddings together with document-topic embeddings; this model has also been extended to the supervised setting. Yang et al. (2015a) models a topic as a Gaussian cluster in the semantic space, thus making the topic model into a Gaussian mixture. Another way to adopt topic modeling into a neural model was proposed in (Wu et al., 2016), where a modification of TweetLDA, LDA for short texts (Quercia et al., 2012), was employed to generate topics and topical keywords as extra information for an input message for a convolutional neural network.

Unlike neural topic models, in the disclosure, a method is provided that matches related art approaches to sentiment-based topic modeling more closely; already related art pretrained word embeddings are used and they are utilized to improve sentiment classification. First, this allows using word embeddings trained on very large corpora and encompassing many different language samples, much more than any sentiment-related dataset might provide. Second, this approach is easier to apply and extend in practical situations: for the English language one can download high-quality word embeddings trained on huge corpora such as Wikipedia, and for other languages one can train word embeddings with related art libraries such as word2vec (Mikolov et al., 2013a) and its reimplementations ((Řehůřek and Sojka, 2010).

All of the above-mentioned publications are incorporated by reference herein in their entireties.

Hereinafter, the various embodiments of the disclosure are described in more detail with reference to the accompanying drawings.

Sentiment Priors as Distributions in the Semantic Space

Previously, sentiment priors are introduced into the model either as predefined prior values drawn from a dictionary or as a set of independent values $\beta_{kw}$ of sentiment priors that have to be trained separately on the E-step of EM-algorithm. In the disclosure, the underlying model of sentiment priors $\beta_{kw}$ is changed: instead of completely independent prior values $\beta_{kw}$ for every sentiment value k and every word w, it is assumed that $\beta_{kw}$ should be similar for words that are similar in the semantic Euclidean space of word embeddings. Suppose that a set Nei(w) of nearest neighbors for every word w is found. This set Nei(w) can, for instance, result from a clustering model or simply from thresholding nearest neighbors with a distance tuned to provide good semantic matches. The semantic matches is good, if similarity thresholds e for the distances d(w,w') is higher than a predetermined threshold.

The EM approach for training sentiment priors is used. On the E-step, the probabilities $p_{kw}$ that word w occurs with sentiment k in the corpus is estimated with counters $n_{kw}$ from the Gibbs sampling process. Then a new regularizer is added on the values of $p_{kw}$ that captures that $p_{kw} \approx p_{kw'}$ for w'∈Nei(w), i.e., words with highly similar vectors should in all probability have the same sentiment. In the resulting optimization problem, log-likelihood of the model is augmented on the E-step, which in this case is a multinomial distribution log $L = \Sigma_{k,w} n_{kw} \log p_{kw}$, with a regularizer R(p) that accounts for this assumption; for convenience of optimization, the regularizer R(p) is represented in logarithmic form, as:

$$R(w) = -\sum_{w' \in Nei(w)} \frac{1}{d(w, w')} \sum_k (\log p_{kw} - \log p_{kw'})^2.$$

In total, on the E-step, maximization is performed as:

$$\log L + \sum_w R(w) = \sum_{k,w} n_{kw} \log p_{kw} - \frac{\alpha}{2} \sum_w \sum_{w' \in Nei(w)} \frac{1}{d(w, w')} \sum_k (\log p_{kw} - \log p_{kw'})^2,$$

where α is a regularization coefficient and d(w,w') is the distance between word vectors for w and w' in the semantic space under the constraints that $\Sigma_k p_{kw} = 1$ for every w. The distances may be Euclidean and cosine distances. This is a quadratic optimization problem on log $p_{kw}$, so it can be solved with off-the-shelf quadratic optimizers. Other possible forms of the word vector regularizer can be used.

Once $p_{kw}$ is found, $\beta_{kw} \propto p_{kw}$ can be set. It is beneficial for the topic model to use a sparsity-inducing prior distribution with small parameters $\beta_{kw}$, so to normalize $\Sigma_k p_{kw}$ to the maximum sum of fixed priors $\beta_{kw}$ based on Nei(w).

Figure 2:
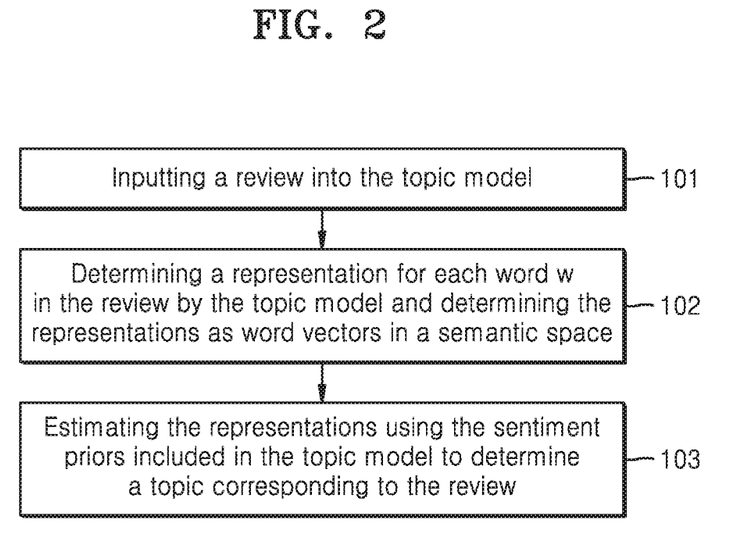
FIG. 2 is a flowchart illustrating a method for topic modeling with sentiment priors based on distributed representations according to an embodiment.

FIG. 2 is a flowchart illustrating a method for topic modeling with sentiment priors $\beta_{kw}$ based on distributed representations. The topic modeling is performed by a topic model including the sentiment priors $\beta_{kw}$ trained on the basis of the representations distributed by using a regularizer R(p). The regularizer R(p) defines the same sentiment k to words w having similar word vectors. Each sentiment prior $\beta_{kw}$ is the same for words w having similar word vectors. On a step 101, a review is input into the topic model. On a step 102, a representation is determined for each word w in the review by the topic model. The representations are determined as word vectors in a semantic space. On a step 103, the representations determined as word vectors in a semantic space are estimated using the sentiment priors $\beta_{kw}$ included in the topic model to determine a topic corresponding to the review. The topic model can be based on any appropriate artificial intelligence means.

Figure 3:
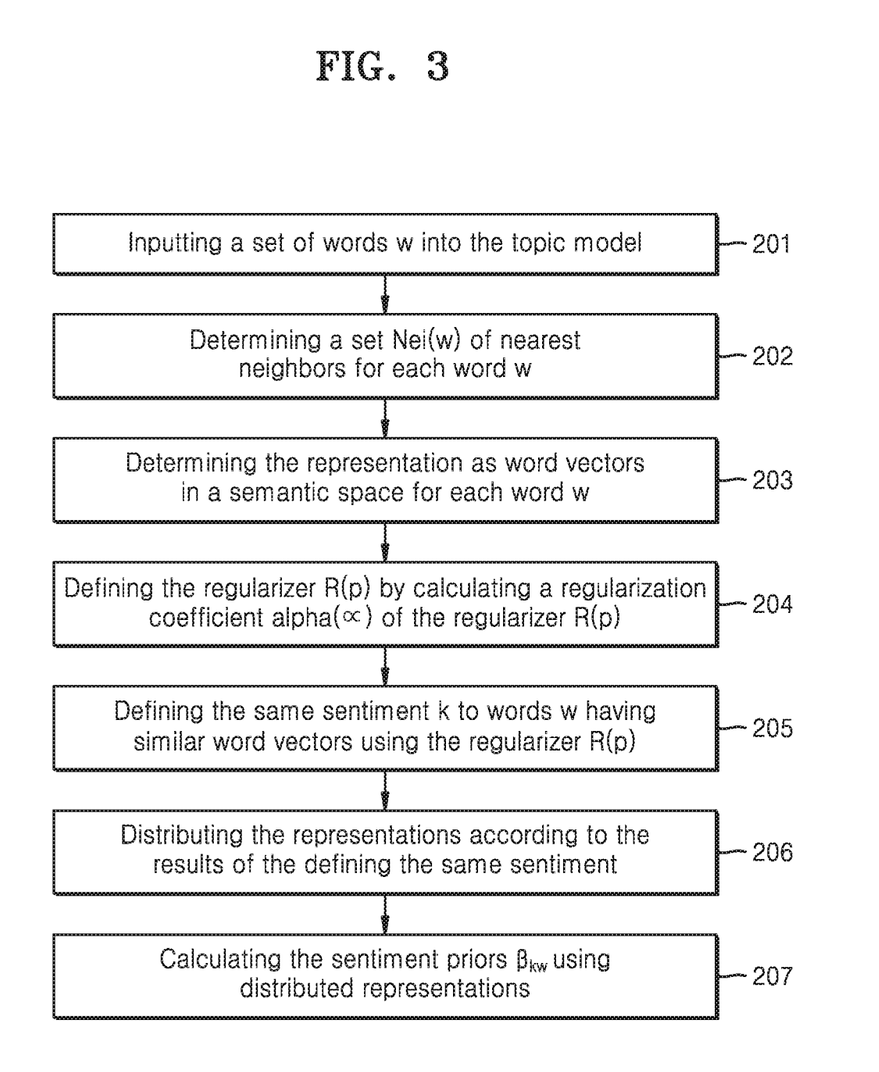
FIG. 3 is a flowchart illustrating a training of sentiment priors in a topic model according to an embodiment.

A training process for training the sentiment priors $\beta_{kw}$ is depicted in the FIG. 3. In a step 201, a set of words w is input into the topic model. Then, steps 202-207 are performed in the topic model. In a step 202, a set Nei(w) of nearest neighbors is determined for each word w. In a step 203, the representation are determined as word vectors in a semantic space for each word w. In a step 204, the regularizer R(p) is defined by calculating a regularization coefficient α of the regularizer R(p). In the calculating a regularization coefficient α, for each word w, probabilities $p_{kw}$ of occurring the word w in sentiment k with certain counters $n_{kw}$ are estimated by using the representations and the set Nei(w) of nearest neighbors. In a step 205, the same sentiment k is defined to words w having similar word vectors by using the regularizer R(p). In a step 206, the representations are distributed according to results of the defining. In a step 207, the sentiment priors $\beta_{kw}$ are calculated using distributed representations.

The training process can include steps of predicting user attributes by the topic model using the sentiment priors $\beta_{kw}$ trained on the basis of the representations distributed by using the regularizer, and updating the sentiment priors $\beta_{kw}$ based on predicted user attributes. The user attributes includes at least one of location, gender, and age of the user.

The step 103 can further include performing a maximization of likelihood of the topic model. The maximization includes: updating the regularization coefficient α of the regularizer R(p); and updating the sentiment priors $\beta_{kw}$ using the regularizer R(p) having updated regularization coefficient α.

Figure 4:
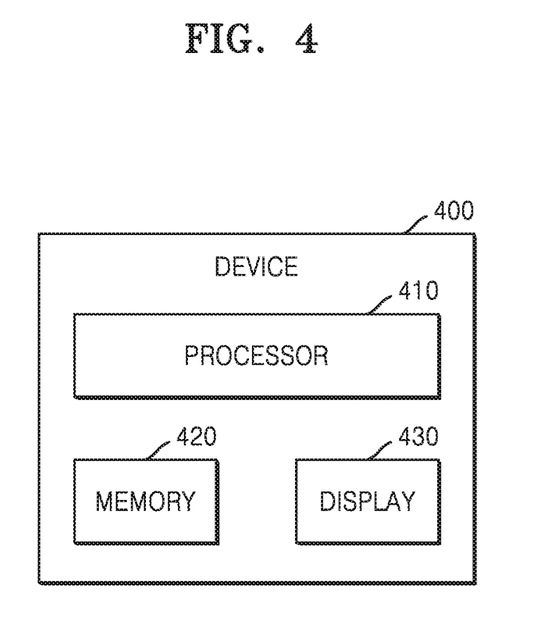
FIG. 4 is a block diagram illustrating a device for topic modeling with sentiment priors based on distributed representations, according to an embodiment.

FIG. 4 is a block diagram illustrating a device for topic modeling with sentiment priors based on distributed representations, according to an embodiment of the disclosure.

Referring to FIG. 4, the device 400 is configured to perform the method for topic modeling with sentiment priors based on distributed representations. The device includes a processor 410; a memory 420 including a topic model and instructions and a display 430. The instructions cause the processor 410 to: input a review into the topic model; determine, by the topic model, a representation as word vectors in a semantic space for each word w in the review; and estimate, by the topic model, the representations using the sentiment priors $\beta_{kw}$ to determine a topic corresponding to the review. The topic model includes the sentiment priors $\beta_{kw}$ trained on the basis of the representations distributed by using a regularizer R(p) having a regularization coefficient α. The regularizer defines the same sentiment k to words w having similar word vectors. Each sentiment prior $\beta_{kw}$ is the same for words w having similar word vectors.

The memory 420 further includes instructions causing the processor 410 to train the sentiment priors $\beta_{kw}$. The instructions cause the processor 410 to input a set of words w into the topic model; and, by the topic model: determine a set Nei(w) of nearest neighbors for each word w, determine a representation as word vectors in the semantic space for each word w; calculate a regularization coefficient α of the regularizer R(p) to define the regularizer R(p) by estimating, for each word w, probabilities $p_{kw}$ of occurring the word w in sentiment k with certain counters $n_{kw}$ by using the representations and the set Nei(w) of nearest neighbors; define the same sentiment k to words w having similar word vectors by using the regularizer R(p); distribute the representations according to results of the defining; and calculate the sentiment priors $\beta_{kw}$ using distributed representations.

The memory 420 further includes instructions causing the processor 410 to train the sentiment priors $\beta_{kw}$ for updating the sentiment priors $\beta_{kw}$ based on user attributes. The user attributes includes at least one of location, gender, and age of the user. The instructions cause the processor 410 to predict user attributes by the topic model using the sentiment priors $\beta_{kw}$ trained on the basis of the representations distributed by using the regularizer R(p); and update the sentiment priors $\beta_{kw}$ based on predicted user attributes.

The instructions causing the processor 410 to estimate the representations using the sentiment priors $\beta_{kw}$ can further include instructions causing the processor 410 to perform a maximization of likelihood of the topic model, including: updating the regularization coefficient α; and updating the sentiment priors $\beta_{kw}$ using the regularizer R(p) having updated regularization coefficient α.

The display 430 may display results of the topic modeling with sentiment priors based on distributed representations.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the disclosure.

Datasets and Settings

The proposed optimization step is described using six datasets available at https://yadi.sk/d/82jgiXddsEtCG. The Hotel dataset consists of reviews of hotels along with author names from TripAdvisor.com. Yang et. al. (2015b) used only 808 reviews with top 5 location tags, so the dataset from (Wang et al., 2011) was adopted. In order to apply USTM, the meta-data of review authors were crawled from more than 300,000 reviews, filtering about half out by requiring that user meta-data has location, gender, and age, and the authors belong to top-50 most common locations. To avoid the sparsity issue, the top 15 location tags along with 5 age tags and 2 gender tags were considered. The Amazon dataset contains product reviews from Amazon.com (https://snap.stanford.edu/data/web-Amazon.html) about computer, automotive, and home tools (further called AmazonComp, AmazonAuto, and AmazonTools respectively). In order to apply USTM, for each dataset the meta-data of review authors were crawled such as location, filtering to top-25 most common locations. Statistics for six datasets is represented in a table 1. In the table 1, a column "Dataset" depicts used dataset, a column "# reviews" depicts a number of the reviews in the datasets, a column "voc. size" depicts a vocabulary size, i.e., a number of unique words in the datasets, a column "# tokens" depicts a number of the tokens in the datasets, a column "avg. len" depicts average length of reviews in the datasets.

TABLE 1

Summary statistics for the review datasets.

| Dataset | # reviews | voc. size | # tokens | avg. len | lang |
|---|---|---|---|---|---|
| Hotel | 26,683 | 18,253 | 2,044,215 | 84.53 | EN |
| AmComp | 76,192 | 22,078 | 4,594,010 | 67.01 | EN |
| AmAuto | 22,362 | 9,719 | 843,519 | 41.81 | EN |
| AmTools | 29,793 | 12,861 | 1,351,649 | 50.52 | EN |
| Restaurant | 45,777 | 26,589 | 3,202,689 | 75.86 | RU |
| Cars | 8,270 | 10,783 | 696,349 | 94.88 | RU |

The Restaurant and Cars datasets consist of Russian reviews crawled from on-line review websites Otzovik.com and Restoclub.ru, respectively; there is no information about review authors. In preprocessing, punctuation is removed, word tokens are converted to lowercase, stopwords adopted from https://pypi.python.org/pypi/stop-words are removed except negations нет (not) and не (no), filtered out are rare words that occur less than 5 times in the dataset and high-frequency words that occur in more than 30% of the reviews, and applied is lemmatization for Russian texts using the Mystem library found at https://tech.yandex.ru/mystem/. Table 1 provides detailed information about each dataset.

For word embeddings, continuous bag-of-words (CBOW) and skip n-gram word2vec models trained on a large Russian-language corpus with about 14 G tokens in 2.5 M documents (Arefyev et al., 2015; Panchenko et al., 2015) were used. Sentiment information is integrated in the described models by using asymmetric priors β. The manually created lexicon for Russian language is consisted of 1079 positive words and 1474 negative words, and the MPQA Lexicon (Wilson et al., 2005) with 2718 positive and 4911 negative words is adopted for English language. Symmetric priors for other words (possibly neutral) that are not found in the seed dictionary are used. Thus, sentiment priors are divided into three different values: neutral, positive, and negative. First the priors β are set for all words in the corpus to $\beta_{kw}$=0.01; then, if a word belongs to the seed sentiment dictionary, the sentiment priors are set for a positive word to $\beta_{*_w}$=(1, 0.01, 0.001) (1 for positive, 0.1 for neutral, and 0.001 for negative); for a negative word, to $\beta_{*_w}$=(0.001, 0.01, 1). Posterior inference for all models was done with 1000 Gibbs iterations with K=10, α=50/K, and γ=0.1.

Results

For each dataset, four topic models are trained: JST, Reverse-JST, ASUM, and USTM. Results of training JST, Reverse-JST, ASUM, and USTM are represented in a table 2. In the table 2, a column "Dataset" depicts used dataset, subcolumns "pos.", "neg.", "neutr." in a column "Labels" depict a number of positive, negative, and neutral labels for the review datasets, respectively, and subcolumns "pos.", "neg." in a column "# tokens" depict a number of positive, negative tokens in the datasets, respectively.

TABLE 2

Summary statistics of positive, negative, and neutral labels for the review datasets.

| | Labels | | | # tokens | |
|---|---|---|---|---|---|
| Dataset | pos. | neg. | neutr. | # pos. | neg. |
| Hotel | 3,136 | 5,884 | 17,663 | 299,017 | 128,885 |
| AmComp | 13,098 | 7,056 | 56,038 | 576,994 | 309,347 |
| AmAuto | 3,225 | 1,554 | 17,583 | 129,185 | 55,771 |
| AmTools | 4,871 | 2,556 | 22,366 | 198,919 | 96,199 |
| Restaurant | 8,728 | 10,791 | 26,258 | 244,596 | 63,987 |
| Cars | 199 | 671 | 7,400 | 64,183 | 19,157 |

Four trained topic models are compared in three variations: (i) with fixed (without any optimization); (ii) with EM optimization as shown in (Tutubalina and Nikolenko, 2015) (marked with "+EM"); (iii) with the proposed optimization step (marked with "+W2V"). The sentiment priors are updated after every 50 iterations.

20% of the training set about hotels and restaurants is used as a validation set to set the regularization coefficient α. In order to train the sentiment priors $\beta_{kw}$, gradient descent is performed with training rate of $10^{-6}$ using the Theano library (Bergstra et al., 2010). For both corpora, the regularization coefficient α is set to 1.0 for all datasets.

For evaluation, 10% of the reviews for testing purposes are used and the remaining 90% is used to train topic models. Cosine similarities between pairs of words with opposite polarities like хороший [good]-плохой [bad], трудно [hard]-нетрудно [not hard], ругать [abuse]-расхваливать [praise] are manually analyzed and similarity thresholds e are chosen for the distances d(w,w') as 0.77 for Russian language and 0.72 for English language.

In the Restaurant dataset, each review is associated with a set of ratings providing scores between 0 (lowest) and 10 (highest) about food, interior, service. These reviews are marked with 'positive' sentiment, if the average rating score is equal or greater than 7. These reviews are marked with negative sentiment, if the rating score is equal to or less than 4. In other datasets, each review is associated with an overall rating between 0 (lowest) and 5 (highest). These reviews are marked from 5 datasets with "positive" or "negative" sentiment, if the rating score is equal or greater than 4 or the rating score is equal or less than 2. The unmarked reviews are treated to be "neutral". Statistics of the corpora are presented in the table 2.

Following (Yang et al., 2015b), the probabilities p(l|d) were calculated based on the topic-sentiment-word distribution φ. In the experiments, a review d is classified as positive, if its probability of positive label $p(l_{pos}|d)$ is higher than its probabilities of negative and neutral classes $p(l_{neg}|d)$ and $p(l_{neu}|d)$, and vice versa. Since ASUM, JST and RJS only consider positive or negative sentiments, evaluated is the performance of all models based only on reviews with either positive or negative ground truth labels. Table 3 presents classification results. The presented results are macro-averaged based on 5-fold cross validation. In the table 3, a column "Model" depicts used method, columns "Hotel", "AmazonComputer", "AmazonAuto" depict the datasets, subcolumns "P", "R", "F1", "Acc" depict a precision of classification, a recall in classification, F-measure, i.e. a measure of a test's accuracy, an accuracy, respectively.

TABLE 3

Comparison of topic models on several real-world datasets; * and † over the accuracy indicates statistically significant improvements over the corresponding model with static $\beta_s$ and $\beta_s$ is optimized by the EM-algorithm, respectively, as measured by the Wilcoxon signed ranks test.

| | Hotel | | | | AmazonComputer | | | | AmazonAuto | | | |
|---|---|---|---|---|---|---|---|---|---|---|---|---|
| Model | P | R | F1 | Acc | P | R | F1 | Acc | P | R | F1 | Acc |
| JST | .987 | .305 | .465 | .351 | .870 | .735 | .797 | .698 | .913 | .499 | .645 | .543 |
| RSJT | .983 | .771 | .864 | .775 | .863 | .256 | .395 | .368 | .880 | .308 | .456 | .378 |
| ASUM | .975 | .794 | .875 | .790 | .903 | .470 | .619 | .533 | .869 | .777 | .821 | .712 |
| USTM | .947 | .834 | .887 | .809 | .839 | .829 | .834 | .734 | .876 | .864 | .870 | .781 |
| JST + EM | .973 | .465 | .629 | .493* | .889 | .597 | .714 | .614 | .851 | .874 | .862 | .765* |
| RSJT + EM | .968 | .554 | .705 | .569 | .771 | .4378 | .558 | .439* | .883 | .514 | .650 | .533* |
| ASUM + EM | .968 | .749 | .845 | .745 | .893 | .504 | .644 | .547* | .845 | .715 | .775 | .649* |
| USTM + EM | .937 | .746 | .831 | .718 | .824 | .837 | .831 | .724 | .862 | .885 | .874 | .784 |
| JST + W2V | .953 | .888 | .919 | .846*† | .852 | .778 | .813 | .712 | .856 | .862 | .859 | .760* |
| RSJT + W2V | .986 | .816 | .893 | .818*† | .851 | .428 | .569 | .479*† | .915 | .311 | .465 | .391* |
| ASUM + W2V | .977 | .803 | .882 | .801*† | .884 | .531 | .664 | .566*† | .896 | .664 | .763 | .650 |
| USTM + W2V | .947 | .961 | .954 | .914*† | .813 | .970 | .885 | .796*† | .863 | .950 | .905 | .831*† |

| | AmazonTools | | | | Restaurant | | | | Cars | | | |
|---|---|---|---|---|---|---|---|---|---|---|---|---|
| Model | P | R | F1 | Acc | P | R | F1 | Acc | P | R | F1 | Acc |
| JST | .883 | .404 | .554 | .462 | .984 | .731 | .839 | .758 | .996 | .438 | .609 | .453 |
| RSJT | .832 | .276 | .415 | .355 | .960 | .330 | .492 | .410 | .997 | .593 | .743 | .603 |

TABLE 3-continued

Comparison of topic models on several real-world datasets; * and † over the accuracy indicates statistically significant improvements over the corresponding model with static $\beta_s$ and $\beta_s$ is optimized by the EM-algorithm, respectively, as measured by the Wilcoxon signed ranks test.

| | | | | | | | | | | | | |
|---|---|---|---|---|---|---|---|---|---|---|---|---|
| ASUM | .881 | .592 | .709 | .597 | .952 | .836 | .890 | .822 | .989 | .756 | .857 | .755 |
| USTM | .855 | .918 | .885 | .803 | | N/A | | | | N/A | | |
| JST + EM | .844 | .597 | .699 | .582* | .975 | .792 | .874 | .804* | .981 | .907 | .943 | .893* |
| RSJT + EM | .747 | .481 | .585 | .495* | .879 | .417 | .566 | .450* | .976 | .722 | .830 | .714* |
| ASUM + EM | .851 | .612 | .712 | .596 | 3.963 | .510 | .667 | .562 | .983 | .658 | .789 | .658 |
| USTM + EM | .821 | .847 | .834 | .725 | | N/A | | | | N/A | | |
| JST + W2V | .838 | .918 | .876 | .785*† | .982 | .729 | .837 | .754 | .981 | .974 | .977 | .956*† |
| RSJT + W2V | .856 | .345 | .492 | .410* | .943 | .498 | .652 | .541*† | .996 | .636 | .776 | .644* |
| ASUM + W2V | .899 | .647 | .753 | .647*† | .984 | .773 | .866 | .793 | .996 | .710 | .829 | .715† |
| USTM + W2V | .846 | .977 | .907 | .833*† | | N/A | | | | N/A | | |

| n. | type | unigrams |
|---|---|---|
| 1 | neu | немецкий [german], volkswagen, дизель [diesel], дизельный [diesel powered], мотор [engine], немец [german], ауди [audi], audi, пассат [passat], мерседес [mercedes], микроавтобус [minibus] |
| 1 | pos | toyota, японский [japanese], bmw, nissan, mitsubishi, тойота [toyota], honda, японец [japanese], высокий [high], внимание [attention], привод [drivegear], модель [model], полный [full] |
| 1 | neg | минус [minus], небольшой [little], достаточно [sufficient], маленький [small], трасса [road], вполне [just], низкий [low], бензин [gasoline], недостаток [weak point], приходиться [have to] |
| 2 | neu | выбор [choice], покупка [purchase], выбирать [to choose], вариант [option], решать [to decide], деньги [money], приобретать [to get], данный [current], находить [to find], хотеться [to wish] |
| 2 | pos | коробка [box], передача [transmission], трасса [road], автомат [automatic], быстро [fast], ехать [to drive], поворот [turn], педаль [push bar], мягкий [soft], управление [running], езда [ride] |
| 2 | neg | иномарка [foreign car], ваз [vaz], калина [], приора [priora], отечественный [home made], лада [lada], автопром [car industry], лад [okay], российский [russian], приор [prior], грант [grant] |
| 3 | neu | дверь [door], передний [front], пассажир [passenger], кнопка [button], сзади [behind], кресло [chair], стекло [glass], водитель [driver], панель [panel], зеркало [mirror], нога [foot] |
| 3 | pos | форд [ford], ford, мазда [mazda], фокус [focus], комфортный [comfortable], класс [class], советовать [to recommend], довольный [satisfied], экономичный [efficient], skoda, друг [friend] |
| 3 | neg | ваз [VAZ], ремонт [repair], запчасть [the spare part], иномарка [foreign car], волга [Volga], состояние [condition], приходиться [have to], отечественный [home made], отец [father] |

Table 4: Topics discovered in the Auto dataset by RJST+W2V.

Several observations can be derived from the results in Table 3. First, results of four models on the Hotel dataset are highly correlated with results in (Yang et al., 2015b). USTM as the state-of-the-art model achieved better results than RJST, JST, and ASUM on four English datasets. Second, for USTM, the results clearly show that USTM+W2V yields an improvement over the original models with sentiment priors based on a predefined sentiment lexicon and USTM+EM. For JST and RJST, results are mixed: JST+W2V and RJST+W2V achieved better accuracy and F1-measure over JST+EM and RJST+EM, respectively, on half of the experiments. Results of ASUM+EM and ASUM+W2V are only slightly better or worse than original ASUM, which makes sense since ASUM presupposes that all words in a sentence are generated from the same sentiment, and according to the disclosure provided is training sentiment priors for individual words.

User Attribute Prediction

According to the disclosure the author's attributes of a review are predicted based on its lexical content, similar to (Yang et al., 2015b). For this purpose, the Hotel dataset with three-dimensional user attributes such as location, gender, and age is used. Mean Average Precision (MAP) is used as an evaluation measure. Table 5 presents the results.

TABLE 5

Topic models performance on the task of predicting the attributes of review authors.

| Model | PLDA | USTM | USTM + EM | USTM + W2V |
|---|---|---|---|---|
| MAP | .338 | .446 | .453 | .475 |

Similar to the sentiment prediction task, the topic model with the proposed optimization USTM+W2V achieved better results than the baseline models PLDA and USTM.

Effect of Similarity Threshold and Regularization Coefficient $\alpha$

According to the disclosure, optimization of sentiment priors $\beta$ based on distributed representations is provided. In order to demonstrate the effects of the threshold distance between word vectors in the semantic space and the regularization coefficient $\alpha$ in the function R(w), USTM is used which has obtained best results in the classification task.

First, validating the effectiveness of the cosine similarity threshold from 0.55 to 0.80 on the Hotel dataset is provided; evaluation results are presented in Table 6. Obviously, the smaller the threshold value chosen, the greater the number of words with at least one nearest neighbors produced. This threshold controls the density of clustering nearest words' priors. The numbers of unique words with $|Nei(w)|\geq 1$ are 13496, 11493, 8801, 4789, and 1177 for e equal to 0.55, 0.60, 0.65, 0.72, and 0.80, respectively. Several observations can be made based on the results. First, USTM+W2V with the lowest thresholds e=0.55 and e=0.60 outperform USTM (see Table 3). Second, USTM+W2V with e=0.80 uses only 6.45% of vocabulary to maximize the function on the E-step and archived the lowest results in Table 6, while best results were obtained by USTM+W2V that uses 26.23%.

TABLE 6

USTM + W2V performance with varying similarity threshold e (Hotel dataset).

| USTM + W2V | P | R | F1 | Acc |
|---|---|---|---|---|
| e = .55 | .955 | .927 | .941 | .892 |
| e = .60 | .960 | .909 | .933 | .881 |

TABLE 6-continued

USTM + W2V performance with varying similarity threshold e (Hotel dataset).

| USTM + W2V | P | R | F1 | Acc |
|---|---|---|---|---|
| e = .65 | .961 | .943 | .952 | .912 |
| e = .72 | .947 | .961 | .954 | .914 |
| e = .80 | .969 | .811 | .884 | .802 |

Figure 5:
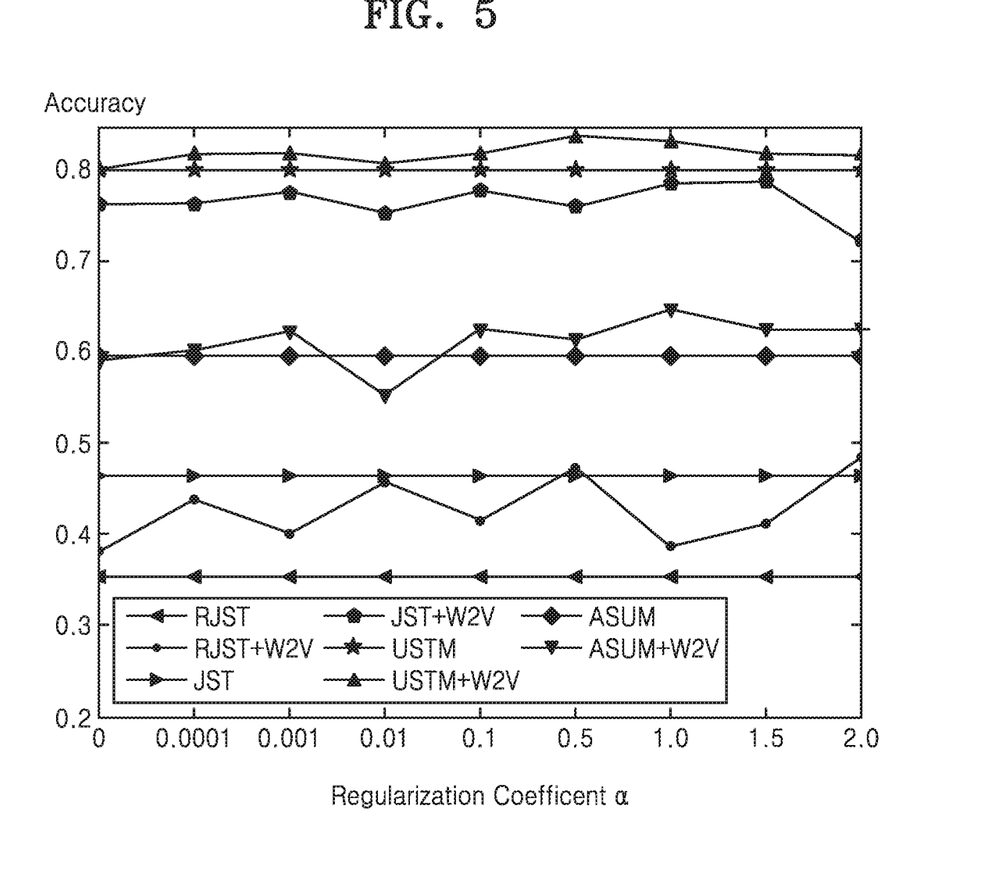
FIG. 5 is a diagram illustrating accuracy of sentiment prediction by varying the regularization coefficient an Amazon-Tools dataset according to an embodiment.

Further the impact of regularization coefficient on the AmazonTools dataset is investigated. FIG. 5 presents the results of this experiment for four models; it shows that for all models the sentiment prediction accuracy reaches maximum value when the coefficient $\alpha$ is set from 0.5 to 1.5.

Comparison of Word Embeddings

Since the word vectors using word2vec models for Russian texts were trained, a set of experiments to compare different word embeddings was conducted. Several word embeddings have been trained with a high-performance GPU implementation of the CBOW model found at https://github.com/ChenglongChen/word2vec_cbow with different parameters s (vector size), w (length of local context), n (negative sampling), and v (vocabulary cutoff: minimal frequency of a word to be included in the vocabulary). Table 7 shows classification results for some characteristic examples for the Reverse-JST model. In general, increasing word embedding dimension up to about 300 improves the results, while the n and v parameters had very little effect.

TABLE 7

Reverse-JST performance with different word embeddings (Restaurant dataset, e = 0.77).

| Word2vec params | | | | | | | |
|---|---|---|---|---|---|---|---|
| s | w | n | v | P | R | F1 | Acc |
| 100 | 11 | 10 | 30 | .889 | .406 | .558 | .446 |
| 200 | 11 | 10 | 20 | .916 | .413 | .569 | .463 |
| 300 | 11 | 1 | 30 | .943 | .498 | .652 | .541 |

For USTM, publicly available GloVe word vectors trained on 6 billion words from newswire text data and Wikipedia (Pennington et al., 2014) is also examined. As shown in Table 8, 200 dimensional GloVe embeddings slightly improved over word2vec embeddings on Hotel dataset. As shown in Table 9, manual probes of different words' sentiment priors confirms that priors' values are more accurate for 200-dimensional vectors over 100 dimensional vectors.

TABLE 8

USTM performance with different word embeddings (Hotel dataset, e = 0.72).

| Word Embeddings | P | R | F1 | Acc |
|---|---|---|---|---|
| GloVe 100d | .959 | .934 | .946 | .901 |
| GloVe 200d | .951 | .970 | .961 | .927 |
| GloVe 300d | .955 | .941 | .948 | .904 |
| word2vec 300d | .947 | .961 | .954 | .914 |

TABLE 9

Sentiment priors of USTM after training with optimization based on Glove 200d and Glove 100d vectors (Hotel dataset).

| Word | Glove 200d | | | Glove 100d | | |
| --- | --- | --- | --- | --- | --- | --- |
| | neut | pos | neg | neut | pos | neg |
| bad | .182 | .001 | .817 | .271 | .001 | .728 |
| badly | .041 | .001 | .958 | .020 | .001 | .979 |
| crowded | .152 | .001 | .847 | .115 | .024 | .861 |
| benefit | .038 | .902 | .059 | .034 | .881 | .085 |
| fix | .465 | .158 | .376 | .569 | .209 | .221 |
| problem | .247 | .161 | .592 | .274 | .001 | .725 |
| wait | .725 | .172 | .102 | .693 | .207 | .099 |
| work | .704 | .189 | .106 | .635 | .097 | .268 |
| wow | .099 | .827 | .028 | .068 | .796 | .136 |
| incredibly | .102 | .819 | .078 | .116 | .784 | .099 |
| beautifully | .089 | .785 | .126 | .083 | .773 | .143 |

Qualitative Analysis

In this section, presented is qualitative analysis on the topics discovered by RJST with w2v-based optimization step. The primary goal of modifying sentiment-specific priors based on distributed word representations is to compute similar priors for semantically-related words so that they have higher probabilities to represent related aspects and similar sentiment. To analyze the results according to this goal, reported are samples of discovered sentiment topics in Table 4. Top ranked terms are illustrated for specific sentiment-related topics.

Table 4 indicates that RJST+W2V mostly extracts semantically-related aspects from reviews representing nouns like car brands in English and Russian (e.g., Volkswagen, toyota, ford, форд [ford]). Second, negative topics show that people suffer with Russian car industry, old cars, and car repair (negative subtopics #2 and #3). Finally, the positive sample extracted by RJST+W2V contains certain aspects like driveability transmission (transmission, fast, drivegear), while neutral subtopics describe car configuration (e.g., mirror, behind, panel, glass) or purchase process (e.g., money, option, to find).

Exemplary embodiment provide for finding coherent topics in more accurate manner.

The foregoing descriptions of the embodiments of the disclosure are illustrative, and modifications in configuration and implementation are within the scope of the current description. For instance, while the embodiments of the disclosure are generally described with relation to FIGS. 1-9, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. Also, the disclosure is not limited by the illustrated order of the method steps, the order may be modified by a skilled person without creative efforts. Some or all of the method steps may be performed sequentially or concurrently. The scope of the embodiment of the disclosure is accordingly intended to be limited only by the following claims.

What is claimed is:

1. A method for topic modeling, the method comprising:
inputting a review into a topic model comprising sentiment priors;
determining representations for each word in the review using the topic model, wherein the representations are word vectors in a semantic space;
predicting user attributes by the topic model using the sentiment priors trained based on the representations distributed by using a regularizer, wherein the user attributes comprise at least one a location, a gender, and an age of a user;
updating the sentiment priors based on the predicted user attributes;
estimating the representations, which are determined as the word vectors in the semantic space, using the sentiment priors which are included in the topic model and trained based on representations distributed using the regularizer which defines a same sentiment to words having similar word vectors; and
determining, based on the estimated representations, a topic corresponding to the review,
wherein each of the sentiment priors trained in the topic model is the same for the words having the similar word vectors, wherein the sentiment priors of the topic model are further trained by:
inputting a set of words into the topic model;
determining a set of nearest neighbors for each of the words of the set;
determining a representation for each of the words of the set, wherein the representation is a word vector in the semantic space;
calculating a regularization coefficient of the regularizer to define the regularizer by estimating with a counter, for each of the words of the set, probabilities of occurring of each of the words of the set in sentiment by using the representation and the set of nearest neighbors of each of the words of the set, respectively;
defining the same sentiment to words having similar word vectors by using the regularizer;
distributing the representations according to results of the defining; and
calculating the sentiment priors using the distributed representations.

2. The method of claim 1, wherein the estimating the representations further comprises performing a maximization of a likelihood of the topic model, and
wherein the performing the maximization comprises:
updating the regularization coefficient; and
updating the sentiment priors using the regularizer having the updated regularization coefficient.

3. The method of claim 1, wherein the estimating the representations further comprises performing a maximization of a likelihood of the topic model, and
wherein the performing the maximization comprises:
updating the regularization coefficient of the regularizer; and
updating the sentiment priors using the regularizer having the updated regularization coefficient.

4. A device for topic modeling, the device comprising:
a memory storing a topic model and instructions; and
a processor which, by executing the instructions, is configured to:
input a review into the topic model comprising sentiment priors;

determine, by using the topic model, representations for each word in the review, wherein the representations are word vectors in a semantic space;

predict user attributes by the topic model using the sentiment priors trained based on the representations distributed by using a regularizer, wherein the user attributes comprise at least one a location, a gender, and an age of a user;

update the sentiment priors based on the predicted user attributes;

estimate, by using the topic model, the representations, which are determined as the word vectors in the semantic space, using the sentiment priors which are included in the topic model and trained based on representations distributed using the regularizer which defines a same sentiment to words having similar word vectors; and determine a topic corresponding to the review based on the estimated representations, wherein each of the sentiment priors trained in the topic model is the same for the words having the similar word vectors, and wherein, for training the sentiment priors, the processor is further configured to:

input a set of words into the topic model; and by using the topic model:

determine a set of nearest neighbors for each of the words of the set;

determine a representation for each of the words of the set, wherein the representation is a word vector in the semantic space;

calculate a regularization coefficient of the regularizer to define the regularizer by estimating with a counter, for each of the words of the set, probabilities of occurring of each of the words of the set in sentiment by using the representation and the set of nearest neighbors of each of the words of the set, respectively;

define the same sentiment to words having similar word vectors by using the regularizer;

distribute the representations according to results of the defining; and calculate the sentiment priors using the distributed representations.

5. The device of claim 4, wherein the processor is further configured to:

in the estimating the representations using the sentiment priors, perform a maximization of a likelihood of the topic model, and wherein, in the performing the maximization, the processor is further configured to update the regularization coefficient and update the sentiment priors using the regularizer having the updated regularization coefficient.

* * * * *